Dec. 26, 1967  L. A. MOORE ET AL  3,360,096
CONVEYING SYSTEM
Filed April 18, 1966
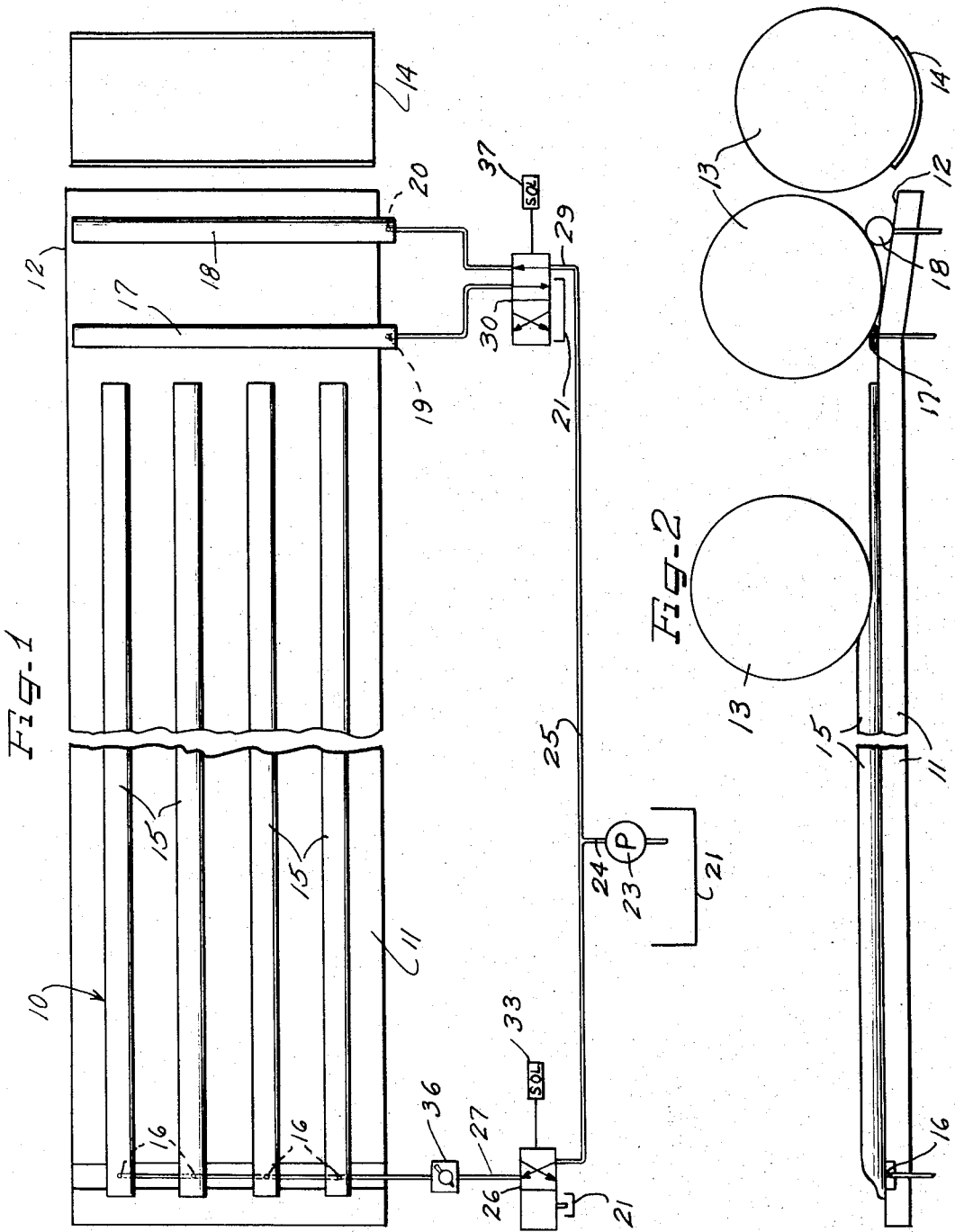
INVENTORS
Lawrence A. Moore
William R. Hilliard

United States Patent Office 3,360,096
Patented Dec. 26, 1967

3,360,096
CONVEYING SYSTEM
Lawrence A. Moore and William R. Hilliard, King of
Prussia, Pa., assignors to Beloit Eastern Corporation,
Downingtown, Pa., a corporation of Delaware
Filed Apr. 18, 1966, Ser. No. 543,209
8 Claims. (Cl. 198—1)

ABSTRACT OF THE DISCLOSURE

Conveying system and apparatus for conveying mill rolls along a platform, in which an expansible track extends along the platform. The track is in the form of a plurality of parallel flat canvas tubes forming a support and track for the mill rolls. Fluid under pressure is admitted to the inby ends of the tubes behind the rolls. This distends the tubes behind the roll and progresses the roll along the track toward the outby end of the track as fluid under pressure moves along the track toward its outby end. Travel of the roll at the discharge end of the track is controlled by a pair of parallel spaced expansible canvas tubes extending transversely of the track and limiting travel of the roll beyond the track and progressing the roll for the performance of further operations on the roll.

Summary and objects of the invention

A principal object of the present invention is to simplify the conveying of mill rolls by conveying the rolls along an expansible track by progressively expanding the track behind the rolls from the inby to the outby end thereof.

A further object of the invention is to provide a simpler and more economical fluid pressure conveying system particularly adapted to convey mill rolls by the progressive passage of fluid under pressure along an expansible track.

A still further object of the invention is to provide an economical, simple, dependable and accurately controlled roll conveying system in the form of at least a pair of parallel generally flat tubes forming an expansible track and progressively expansible from the inby to the outby end of the track, for the progression of mill rolls therealong.

Still another object of the invention is to provide a conveying system adapted for conveying any number and size of rolls by utilizing a bank of generally flat expansible tubes as the support medium for the rolls and progressively supplying fluid under pressure to the tubes from the inby to the outby ends thereof to progressively expand the tubes behind the roll thereon.

A further object of the invention is to provide a novel fluid pressure roll conveying system arranged with a view toward utmost simplicity, efficiency and accuracy of control, and particularly adapted to convey mill rolls and position and discharge the rolls for wrapping and other operations to be performed thereon.

A still further object of the invention is to provide a conveying and transferring system for mill rolls, transferring and positioning the rolls for wrapping and other operations to be performed thereon, in which the rolls are transferred along a relatively level platform by a bank of parallel expansible tubes forming an expansible track, progressively advancing the rolls from the inby to the outby end of the platform, and in which the control of the discharge of rolls from the platform is attained by a pair of transverse parallel spaced tubes alternately expansible to limit travel of the rolls at the discharge end of the platform and to effect the discharge of the rolls from the platform for wrapping and other operations.

These and other objects of the invention will appear from time to time as the following specification proceeds and with reference to the accompanying drawings wherein:

FIGURE 1 is a diagrammatic plan view of a fluid pressure conveyor constructed in accordance with the principles of the present invention and diagrammatically showing an illustrative form of fluid control system, controlling operation of the conveyor; and FIGURE 2 is a diagrammatic side elevational view of the conveyor shown in FIGURE 1.

In the embodiment of the invention illustrated in the drawings, I have diagrammatically shown in FIGURES 1 and 2 a fluid pressure expansible track 10, which may be expanded or inflated by a liquid or air under pressure. The track 10 is shown as extending along a platform 11 which may be elevated above the floor, may be at floor level or may be depressed below the floor.

The platform 11 is shown as being level for a greater part of its length and may be of any required length and as having a sloping discharge end 12 extending at a slight slope with respect to the horizontal, and shown in FIGURE 2 as arranged to discharge a roll 13, onto a shoe 14, which may be the support shoe of a conveyor, conveying and centering the roll for wrapping and like operations.

The track 11 is shown as comprising a plurality of parallel spaced generally flat tubes 15 extending along the level portion of the platform 11 and suitably secured thereto in parallel relation with respect to each other. The tubes 15 expand to generally round conditions and are shown as having inby ends having fluid pressure fittings 16 attached and sealed thereto and as having closed outby ends, terminating at the sloping discharge portion 12 of the platform. The fittings 16 may be of a conventional form and are shown as entering the tubes from their bottoms to accommodate a roll 13 to be rolled thereonto.

The sloping discharge portion 12 of the platform is shown as having two laterally extending and longitudinally spaced generally flat expansible tubes 17 and 18 extending thereacross, closed at one end and having fluid pressure fittings 19 and 20 respectively sealed to opposite ends thereof. The expansible tube 18 serves as a stop to limit travel of a roll 13 at the discharge end of the platform and to accommodate a roll 13 to be discharged from the platform upon expansion of the tube 17 and contraction of the tube 18. The tubes 17 and 18 are alternatively supplied with fluid under pressure, to provide a controlled discharge of the rolls 13 onto the support shoe 14, or any other support or carrying means therefor.

The expansible tubes 15, 15, 17 and 18 may be made from a rubber impregnated canvas material which will lie flat when deflated as in a fire hose, and may be expanded to a substantially round form by the admission of fluid under pressure thereto. The tubes 15, 15, 17 and 18 of themselves may be made from various materials and are no part of the present invention, so need not herein be shown or described further.

A means is provided for supplying fluid under pressure to the tubes 15, 15 and for alternately supplying fluid under pressure to the tubes 17 and 18 to effect the advance of a roll along the tubes 15, 15 from the inby to the outby ends thereof as fluid under pressure is admitted to the tubes behind a roll thereon through the fittings 16, 16 and the tubes are progressively expanded behind the roll.

The fluid pressure supply means may be of any conventional form and is herein diagrammatically shown for illustrative purposes as being a liquid supply system having a supply tank 21 and a pump 23, which may be driven from a suitable motor (not shown). The pump 23 takes fluid from the tank 21 and supplies fluid under pressure to a pressure line 24 having connection with a pressure line 25, connected with a conventional form of two-way solenoid operated valve 26. The valve 26 supplies fluid under pressure to the inby ends of the tubes 15, 15 through a pressure line 27 connected with the fittings 16, 16. The fluid pressure line 24 also has a second branch line 29 supplying fluid under pressure to a valve 30, which may be a conventional form of solenoid operated four-way valve and is connected with the tubes 17 and 18 through pressure lines 31 and 32 to alternately supply and release fluid under pressure to and from the tubes 17 and 18 in accordance with the position of the valve 30.

The valve 26 is shown as being operated by a solenoid 33 and may be returned by a spring (not shown), and is positionable in one position to supply fluid under pressure along the pressure lines 25 and 27 through the fittings 16 to the tubes 15 and in another position to release fluid to flow from the tubes 15 back to tank 21.

A manually adjustable flow control valve 36 is shown as being connected in the pressure line 27 downstream of the valve 26 and upstream of the tubes 15, 15 to vary the quantity of fluid supplied to the tubes 15, 15 and the rate of travel of a roll along said tubes. The flow control valve 36 may be manually operated and may be of a type which will regulate the flow of fluid under pressure to the tubes 15, 15 and accommodate a free back flow of fluid through the valve upon movement of the valve 26 in position to drain the tubes 15, 15 to tank. A variable pressure relief valve (not shown) may also be connected in the pressure line 27 and set to release pressure from said tubes upon overload conditions.

The valve 30 is operated by a solenoid 37 which may be of a type that is momentarily operated to expand a tube 17 and release fluid from a tube 18 and vice versa, and retain said tubes in expanded and contracted conditions for the time required to transfer a roll of paper from the sloping discharge end 12 of the platform 11 onto the shoe 14, or other support or conveying device therefor.

When a mill roll of paper or other material is discharged onto the platform 11, on the inby ends of the tubes 15, 15, the valve 30 may be in position to expand the tube 18 and release fluid from the tube 17. The valve 26 may then be operated by the solenoid 33 and moved into position to supply fluid under pressure to the inby ends of the tubes 15, 15 under the control of the flow control valve 36. Fluid under pressure entering the tubes 15, 15 behind the roll 13 will thus expand the tubes 15, 15 behind the roll and advance the roll along the platform 11 over the contracted tube 17 to the expanded tube 18 serving to stop travel of the roll. At this time, the tube 17 may be expanded and fluid may be released from the tube 18, to accommodate the tube 17 to advance the roll of paper along the sloping portion of the platform over the flat tube 18 onto the shoe 14 for further operations on the roll.

It may be seen from the foregoing that an inexpensive, simple and positive conveyor system has been provided, which is particularly adapted for conveying rolls of paper, plastic film, textiles or even metal along a level surface and that a controlled discharge from the conveyor has been attained, controlling discharge of the roll beyond the ends of the tubes 15, 15 and advancing the roll for further operations, in simple and easy stages.

It may further be seen that movement of the roll along the tubes 15, 15 may be accurately controlled by the flow control valve 36 and the roll may be moved without the necessity of depending upon gravity or the use of the complicated and expensive conveying systems heretofore used for the purpose of conveying relatively large diameter heavy mill rolls.

While we have herein shown and described one form in which the invention may be embodied, it may readily be understood that various variations and modifications in the invention may be attained without departing from the spirit and scope of the novel concepts thereof.

We claim as our invention:

1. In a conveying apparatus particularly adapted for mill rolls,
   a stationary platform,
   an expansible track supporting and moving mill rolls along said platform comprising,
      at least two flat tubes extending along said platform,
      each having an inby and an outby end and being expansible from a flat to a distended condition,
      means admitting fluid under pressure to said tubes at the inby ends thereof and behind a roll thereon, to distend said tubes and progress the roll therealong toward the outby ends thereof,
      and other means on said platform spaced in advance of the outby end of said track for limiting travel of the roll and controlling advance thereof for a next succeeding operation to be performed thereon.

2. In a conveying apparatus particularly adapted for mill rolls,
   an expansible track for the rolls comprising at least two parallel spaced normally flat canvas tubes impregnated with rubber,
   fluid pressure fittings at the inby ends of said tubes for admitting fluid under pressure thereto,
   means sealing the outby ends of said tubes closed,
   said tubes becoming generally round in cross-section when distended by fluid under pressure and progressing the roll therealong from the inby to the outby end thereof as fluid under pressure is admitted to the inby ends thereof behind a roll thereon and moves along said tubes toward the outby ends thereof.

3. The structure of claim 2,
   wherein a transversely extending expansible tube is spaced from the outby ends of said tubes, to limit travel of the roll and control advance of the roll for a next succeeding operation to be performed thereon.

4. The structure of claim 2,
   wherein a pair of parallel spaced expansible tubes extend transversely of said canvas tubes in advance of the outby ends thereof, to limit the discharge of rolls from said canvas tubes and to progress the roll for further operations to be performed thereon.

5. A conveying system for mill rolls and the like comprising:
   a platform having a level portion extending for a greater portion of the length thereof,
   and a sloping discharge portion,
   an expansible track extending along said level portion and generally flat when contracted,
   means supplying fluid under pressure to said track behind a roll thereon to expand said track and effect the advance of a roll along said track,
   and means controlling travel of the roll along the sloping discharge portion of said track comprising at least one expansible stop extending transversely of said track along the sloping portion thereof.

6. The structure of claim 5,
   wherein the stop is a fluid pressure expansible tube,
   wherein a second tube is provided at the upper end of said sloping discharge portion of said platform,
   and wherein said tubes are alternately expansible and contractible to stop travel of a roll along said sloping discharge portion of said platform and to then advance a roll beyond the end of said sloping discharge portion for the performance of further operations thereon.

7. The structure of claim 5,
   wherein the expansible track comprises at least two expansible tubes expanding from flat to round conditions upon the admission of fluid under pressure thereto,
   and wherein means are provided for admitting fluid under pressure to flow from the inby to the outby ends thereof to progress a roll therealong, and to release fluid under pressure therefrom at the termination of a conveying operation.

8. The structure of claim 5,
wherein the expansible track comprises a plurality of parallel spaced expansible tubes extending along the level portion of said platform,
wherein two longitudinally spaced expansible stops extend transversely of said track along the sloping discharge portion of said platform,
wherein means are provided for expanding said tubes from flat to generally round cross-sections from the inby to the outby ends thereof to progress a roll therealong by the passage of fluid therealong,
and wherein other means are provided for alternately expanding and contracting said expansible stops extending transversely of said track along the sloping portion of said platform, to limit travel of the roll beyond the sloping end portion of said platform and to advance a roll beyond the sloping portion of said platform for the performance of further operations thereon.

References Cited
UNITED STATES PATENTS

| | | | |
|---|---|---|---|
| 3,087,602 | 4/1963 | Hinkle | 198—220 |
| 3,209,894 | 10/1965 | Baechli | 198—1 X |

EDWARD A. SROKA, *Primary Examiner.*

EVON C. BLUNK, *Examiner.*

A. C. HODGSON, *Assistant Examiner.*